US012740518B2

(12) United States Patent
Lips

(10) Patent No.: US 12,740,518 B2
(45) Date of Patent: Sep. 22, 2026

(54) LIQUID ADDITIVE CONTROLLER SYSTEM AND METHOD FOR HORTICULTURAL WATERING SYSTEMS

(71) Applicant: Jon S Lips, Erie, CO (US)

(72) Inventor: Jon S Lips, Erie, CO (US)

( * ) Notice: Subject to any disclaimer, the term of this patent is extended or adjusted under 35 U.S.C. 154(b) by 407 days.

(21) Appl. No.: 18/538,193

(22) Filed: Dec. 13, 2023

(65) Prior Publication Data

US 2024/0188516 A1 Jun. 13, 2024

Related U.S. Application Data

(60) Provisional application No. 63/432,140, filed on Dec. 13, 2022.

(51) Int. Cl.

| | |
|---|---|
| ***A01G 25/16*** | (2006.01) |
| ***A01C 23/04*** | (2006.01) |
| ***A01M 7/00*** | (2006.01) |

(52) U.S. Cl.

CPC ............ *A01G 25/16* (2013.01); *A01C 23/042* (2013.01); *A01M 7/0092* (2013.01)

(58) Field of Classification Search

CPC .... A01G 25/16; A01G 25/165; A01C 23/042; A01M 7/0092

USPC .......................................................... 700/284

See application file for complete search history.

(56) References Cited

U.S. PATENT DOCUMENTS

| | | | | |
|---|---|---|---|---|
| 6,314,979 | B1 * | 11/2001 | Lips | A01G 25/16 137/624.2 |
| 8,434,697 | B1 * | 5/2013 | Olt | B05B 12/12 239/340 |
| 11,707,026 | B1 * | 7/2023 | Hansen | A01G 25/162 700/284 |
| 2004/0049978 | A1 * | 3/2004 | Lips, II | A01C 23/042 47/48.5 |
| 2010/0076610 | A1 * | 3/2010 | Hong | G05D 22/02 700/284 |
| 2014/0117108 | A1 * | 5/2014 | Hong | A01G 25/167 239/64 |
| 2021/0360847 | A1 * | 11/2021 | Mcenaney | C05D 9/02 |
| 2022/0015287 | A1 * | 1/2022 | Kramarenko | G05B 13/028 |
| 2023/0172098 | A1 * | 6/2023 | Geerligs | A01C 23/007 47/48.5 |

* cited by examiner

*Primary Examiner* — Chun Cao

(74) *Attorney, Agent, or Firm* — AVEK IP, LLC

(57) ABSTRACT

A liquid additive control system for use in a horticultural irrigation system such as a residential or commercial sprinkler system. The liquid additive is injected directly into the irrigation system. The system is capable of being introduced into an existing and/or newly installed irrigation system. Two or more different types of liquid additive can be connected to the same irrigation system, such as to provide shrub and bush liquid additive (e.g. a phosphorus liquid additive) for one zone and lawn liquid additive (e.g. a nitrogen liquid additive) for another zone. An existing sprinkler timer could be adapted to connect to a liquid additive controller and remote controller(s) and associated valve boxes and sprinkler heads, or a standalone unit could provide both sprinkler timer and liquid additive controller functionality.

17 Claims, 9 Drawing Sheets

LIQUID ADDITIVE CONTROLLER SYSTEM AND METHOD FOR HORTICULTURAL WATERING SYSTEMS

CROSS-REFERENCE TO RELATED APPLICATION

This application claims priority in U.S. Provisional Patent Application No. 63/432,140 Filed Dec. 13, 2022, which is incorporated herein by reference.

BACKGROUND OF THE INVENTION

1. Field of the Invention

The present invention relates generally to an electronic controller system and method for use thereof, and more specifically to a controller system for providing liquid additive for horticultural watering systems.

2. Description of the Related Art

Various approaches have been proposed for the injection of liquid additives, such as fertilizers, pest repellents, pesticides, and other liquid additives into horticultural watering systems. Of particular interest, liquid additives have been injected into watering systems employed in the turf growth/maintenance industry, golf courses and agriculture for many years.

Known approaches for liquid additive injection have included both powered and non-powered systems. By way of primary example, metering pumps have been utilized in connection with golf course watering systems around the world. Such systems have proven too expensive to implement in many applications, including for example residential sprinkler systems.

Proposed non-powered systems have included venturi-type injectors and flow-through injectors. The venturi-type injectors have had limited success due to unacceptable attendant pressure loss in the system. Flow-through injectors provide for the flow of water through a reservoir, or pot, charged with a liquid or water soluble, granulated liquid additive. Such systems generally require recharging of the reservoir upon each use. Further, the reliable obtainment of a desired liquid additive application rate has proven problematic.

More generally in the later regard, it has been recognized that the application of small dosages of liquid additive to turf or foliage over an extended time is preferable to a single high dosage application. Low dosages avoid extreme growth spurt/burning cycles, and otherwise enhance the establishment of desirable root structures. In turn, susceptibility to pest and weed infestation is significantly reduced.

While some systems have addressed some of these issues, such as those taught by U.S. Pat. No. 6,314,979 to Lips for a Liquid Injection Apparatus and Method for Horticultural Watering Systems, even those improvements lack the capability of utilizing two or more different liquid additive types. These systems also require additional wiring that may be made redundant through improvements.

Heretofore there has not been available a system or method for a liquid additive control system for horticultural irrigation systems with the advantages and features of the present invention.

BRIEF SUMMARY OF THE INVENTION

The present invention generally provides a liquid additive (e.g. fertilizer) control system for use in a horticultural irrigation system such as a residential or commercial sprinkler system. The liquid additive is injected directly into the irrigation system. The system is capable of being introduced into an existing and/or newly installed irrigation system.

Two or more different types of liquid additive can be connected to the same irrigation system, such as to provide shrub and bush liquid additive (e.g. a phosphorus liquid additive) for one zone and lawn liquid additive (e.g. a nitrogen liquid additive) for another zone.

A controller unit is electronically connected to a sprinkler timer which controls the irrigation system. The controller unit effectively jumps between the sprinkler timer and the various sprinkler valves of the various zones. The controller can use the same power as the sprinkler timer eliminating the need for a separate power source. The controller can use 3 of the existing sprinkler wires; one to power to the remote unit and two wires to communicate with the remote unit, typically RS485. This eliminates the need to run additional wires from the controller to the remote unit.

A remote controller can be connected to the controller unit and is designed to control the various injectors as well as some or all of the sprinkler valves.

An integrated timer and liquid additive controller can be incorporated. This integrated timer can eliminate need for jumper wires. It can also be incorporated to local weather data to not only modify the amount of water applied through the watering system based on environmental factors but also to modify the amount of liquid additive.

The integrated sprinkler timer and liquid additive controller can also be configured with different additives to control different combinations of liquid additives to different watering zones based on environmental factors, season, vegetation etc.

Control of the liquid additives can all be configured by the user as well as by software from user inputs such as type of plant being watered, whether it is in full sun, partial sun or shade, what the precipitation rate of the watering system is to that zone, what part of the season it is as well as external inputs such as data from local weather stations in and around the local area. The control system can vary not only the rate of injection but the type of additive, the combination of additive or no additive at all.

These systems can also incorporate a flow meter in the watering system that can influence the rate of additive injection thereby delivering a specific concentration of a specific additive or combination of additives to a specific zone.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Liquid Additive Controller System 2

Figure 1:
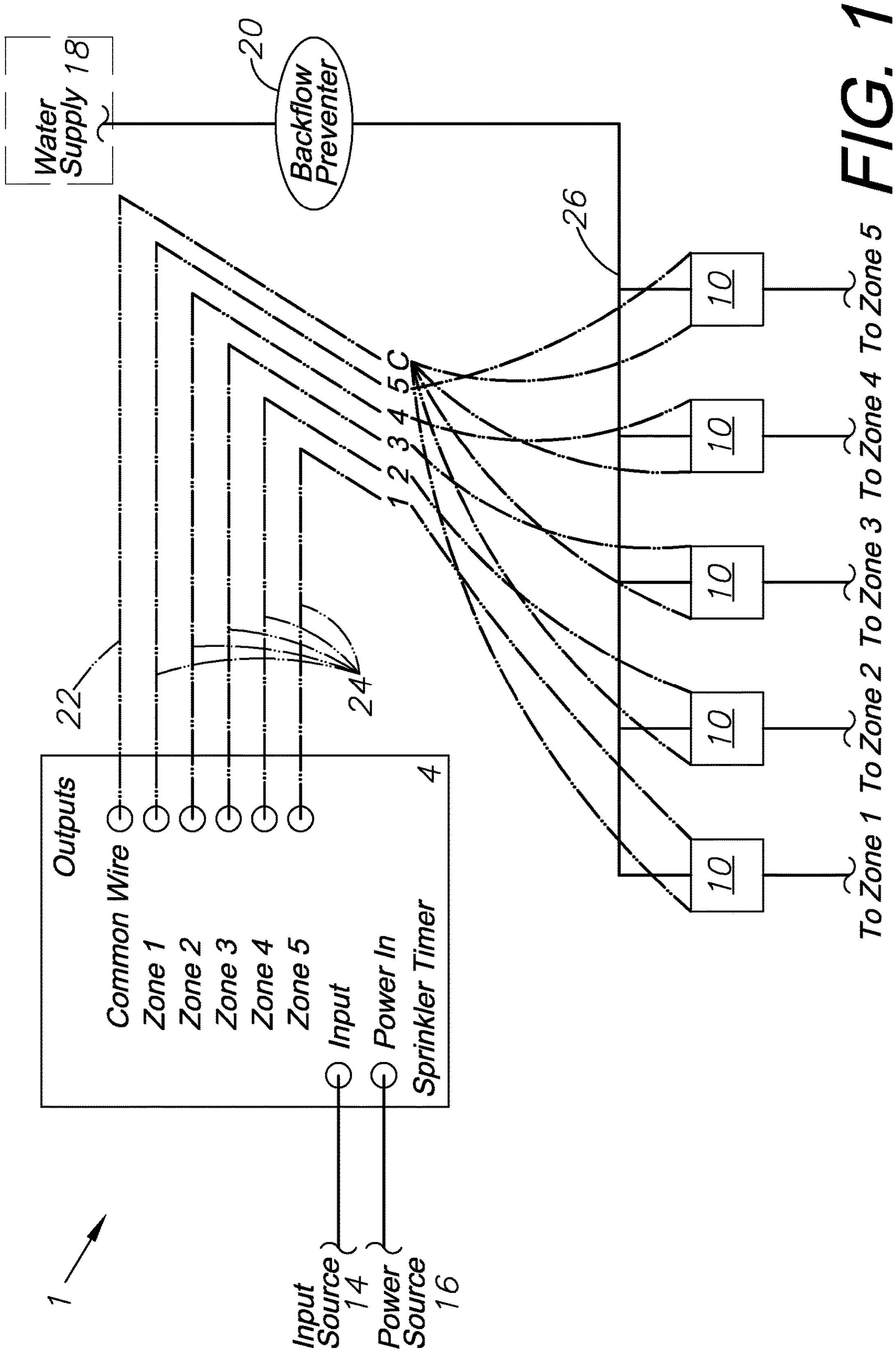
FIG. 1 is a diagrammatic representation of an embodiment of a standard, prior art sprinkler system.

As shown in FIG. 1, a typical, prior-art horticultural watering system 1 found in a residential home includes a sprinkler timer 4 with power wires 22, 24 running from the sprinkler timer out to a plurality of zone valves. The residential water supply 18 runs out of the house through a backflow preventor 20 via a water supply line 26 and down to one or more valve boxes 10 containing, in this case, five zone valves. Typical systems may have multiple valve boxes and may have many more or less zones.

Figure 2:
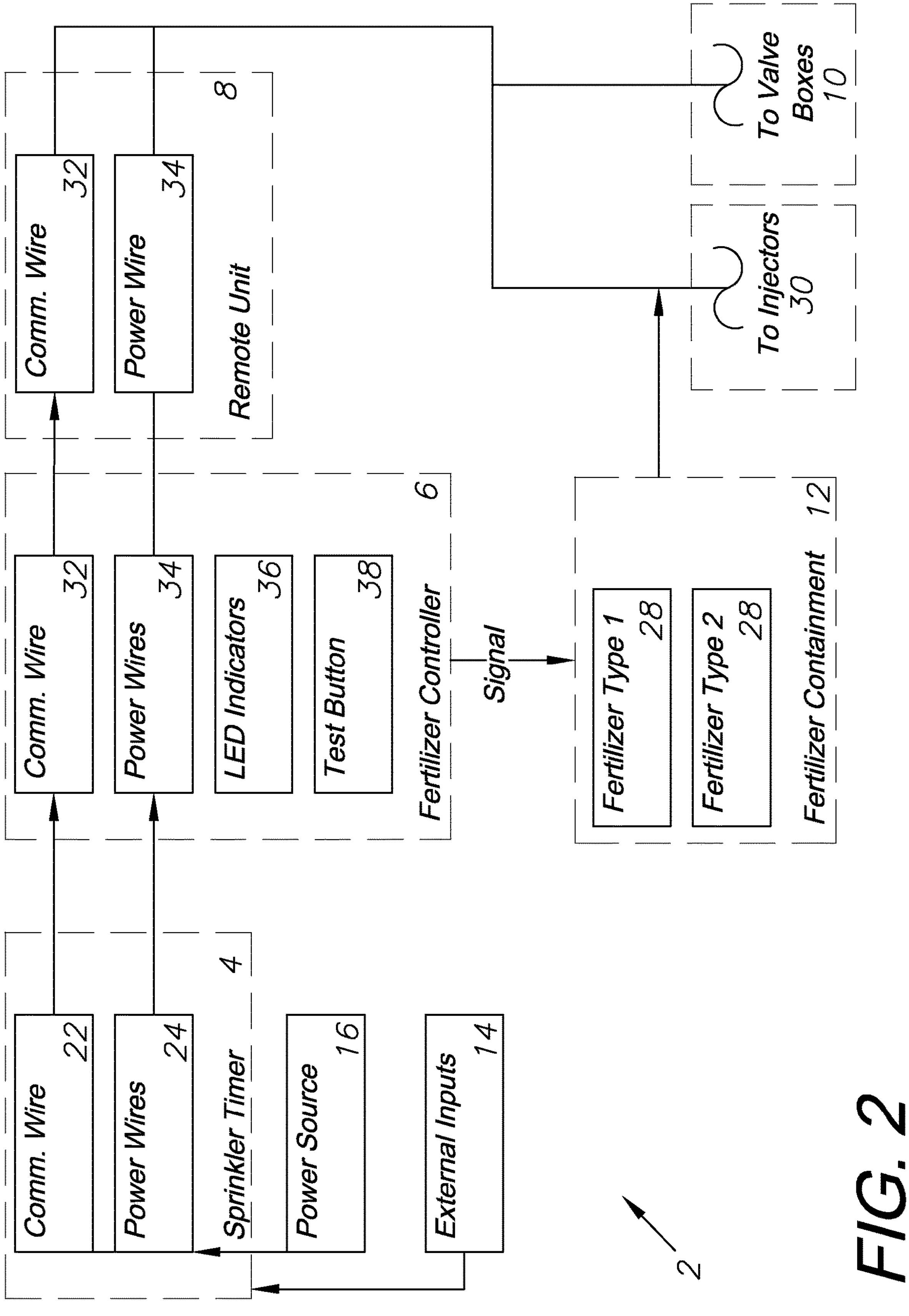
FIG. 2 is a block diagram representing an embodiment of the present invention including a liquid additive subsystem.
Figure 3:
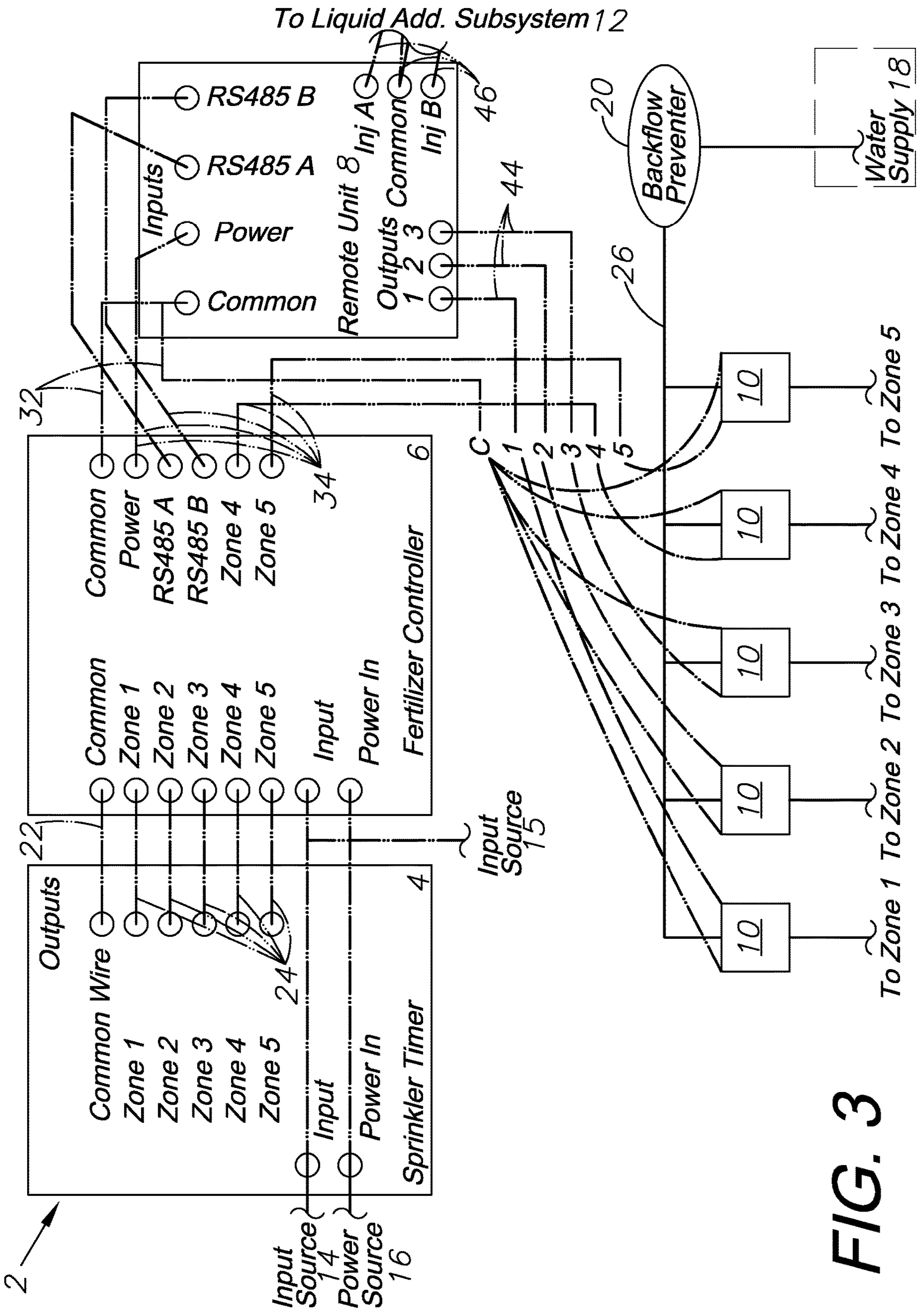
FIG. 3 is a diagrammatic representation of an embodiment of the present invention shown in conjunction with an existing horticultural irrigation system.

As shown in FIGS. 2 and 3, the liquid additive (e.g. fertilizer) controller 6 system 2 includes a sprinkler timer 4 which is connected to an existing (or newly installed) irrigation system with a number of sprinkler zones (typically numbering three to twelve). Each of these zones will have one or more sprinkler heads spaced throughout their respective zones. The sprinkler timer 4 includes an input signal source 14 and a power source 16, such as being connected to a power grid. The sprinkler timer also has a number of output power wires 24 and a common wire 22 connected to the various zone valves. A fertilizer containment subsystem 12 may be integrated to provide one or more liquid additives to the sprinklers. As shown, two liquid additive containers 28 are fluidly connected to two injectors 30 which are fluidly connected to the water supply 18. The injectors are also electrically connected to the remote unit FIG. 3 is an alternative diagrammatic representation of FIG. 2. A liquid additive controller unit 6 is shown installed in proximity with the sprinkler timer 4. The common wire 22 and power wires 24 of the sprinkler timer are instead rerouted through (or jumpered to) the controller unit 6. The controller unit 6 also may include LED indicators showing which zones are active, and a test button for testing the communication to the remote unit. The power from the power source 16 to the sprinkler timer 4 is also jumpered to power the liquid additive controller 6. A secondary input source 15 associated with the controller unit 6 may also provide inputs to the controller as shown.

A remote unit 8 is dispersed remote from the controller unit 6 near the valve box 10. The common wire 22 and power wires 24 from the sprinkler timer are repurposed through the controller unit 6, such that the remote controller(s) for the first three zone valves are powered and controlled via the remote unit wires 44 with no need for specific power wires from the sprinkler timer 4. The remaining zone valves are powered traditionally via the jumpered power wires 34. This reduces the total number of power lines required thereby saving on material costs and installation. Remote output wires 46 from the remote unit 8 to the liquid additive subsystem 12 allow the remote unit to control the injectors for the zone(s) in which it controls.

Figure 4:
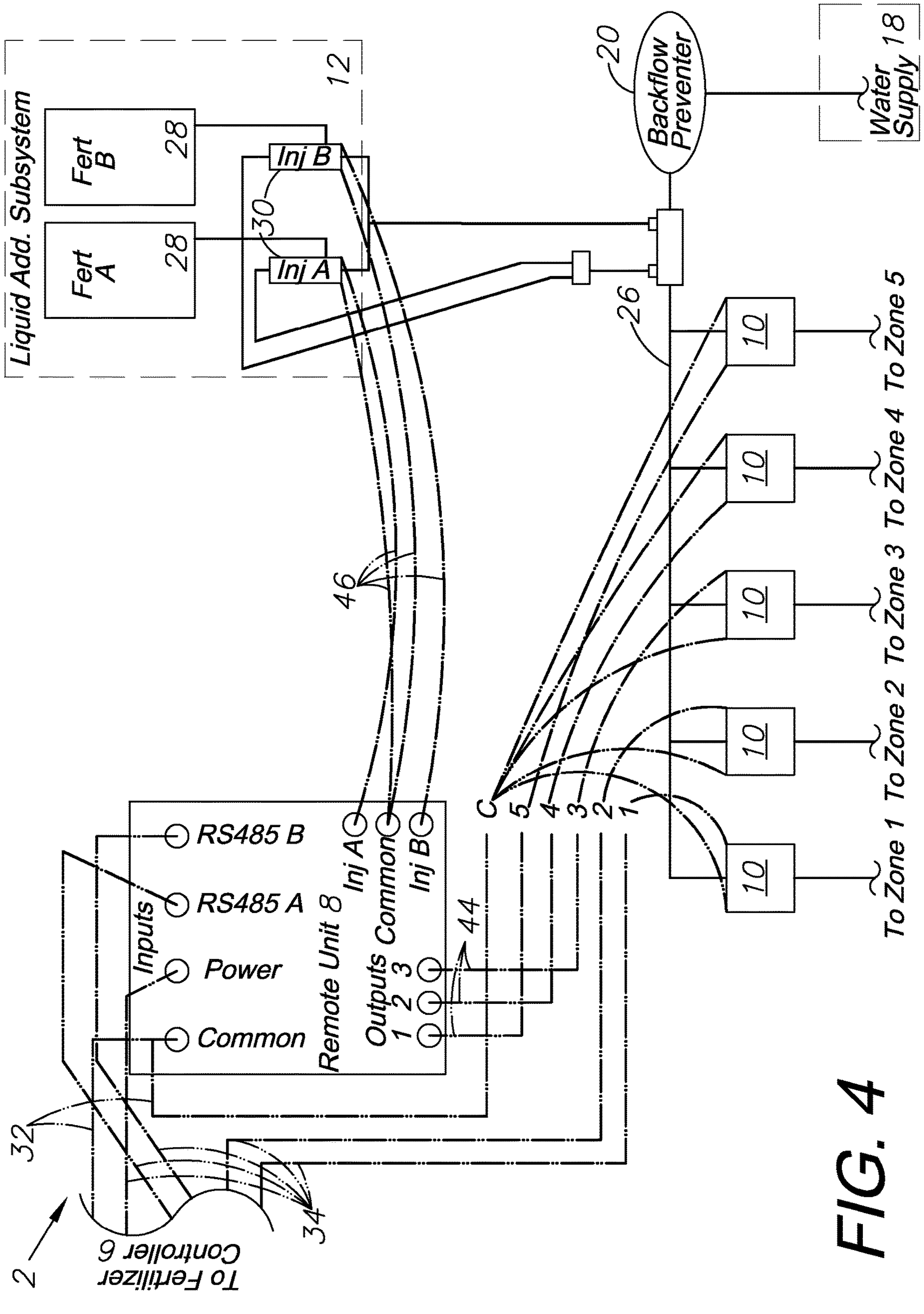
FIG. 4 is a diagrammatic representation of an embodiment of the present invention shown in conjunction with an existing horticultural irrigation system including the injectors and liquid additive containment system. This shows both the fluid connections from the injectors to the water supply but also the electrical connections from the remote unit to the injectors.

FIGS. 3 and 4 show a liquid additive containment subsystem 12 which contains two or more liquid additive types stored in liquid form in their respective tanks 28. These tanks are fluidly connected to the injectors 30 which are in turn fluidly connected to the irrigation system and are controlled via the liquid additive controller system 2. One or more liquid additive types can be distributed to each respective zone as required. Combinations of liquid additive types can be used to serve different plant zone types by activating more than one injector at equal or differing injection rates based on the signal from a single irrigation zone as well as the programming from the user.

Most typical sprinkler systems include a master valve output. This master valve output is typically energized when any of the output zones are activated. This master valve output can either pass through the controller, be routed around the controller and directly to the master valve or can be used by the controller like a standard zone output to trigger one or more injectors. Because the master valve comes on whenever any valve comes on resulting in two outputs at the same time. It is possible to program the controller to prioritize the numbered zone valve input to the controller over the master valve input. This would allow the user to select multiple zones to all have the same injection rates by using the master valve jumper wire. Any zone requiring a different injection rate could utilize the zone jumper wire which would override or be prioritized over the master valve programming and could trigger a unique injection rate for that zone. For example, if the controller can only service 12 zones and the sprinkler system has thirty-five valves, but thirty of the thirty-five zones all feed turf zones with a similar water flow rate, the user could utilize the master valve to trigger the fertilizer injector for those thirty zones. The five remaining "different zones" could be jumpered to the controller as described previously. Since these outputs would be numbered zone inputs to the controller, their injection rates would be used.

Figure 5:
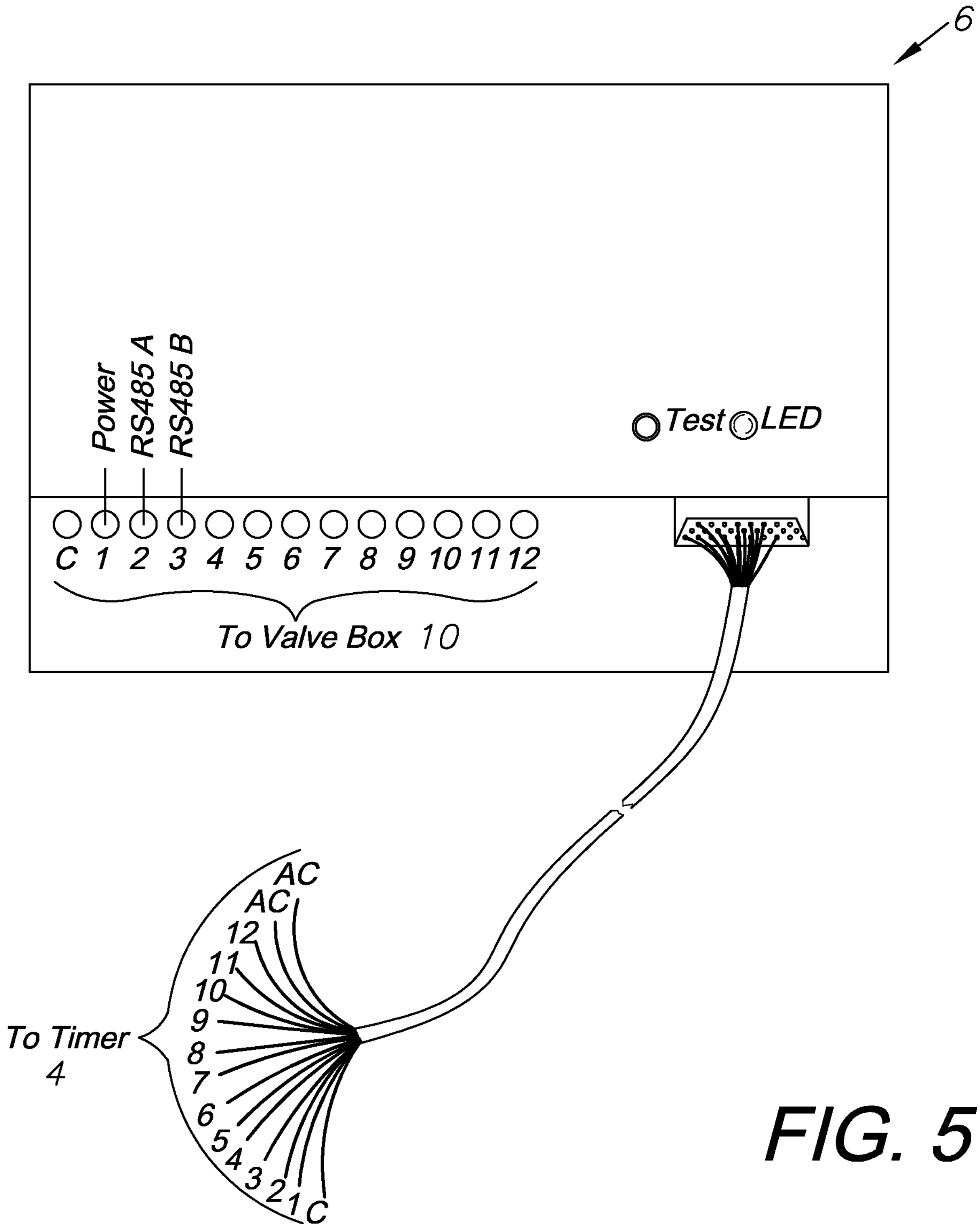
FIG. 5 is a drawing of a control unit element thereof.
Figure 6:
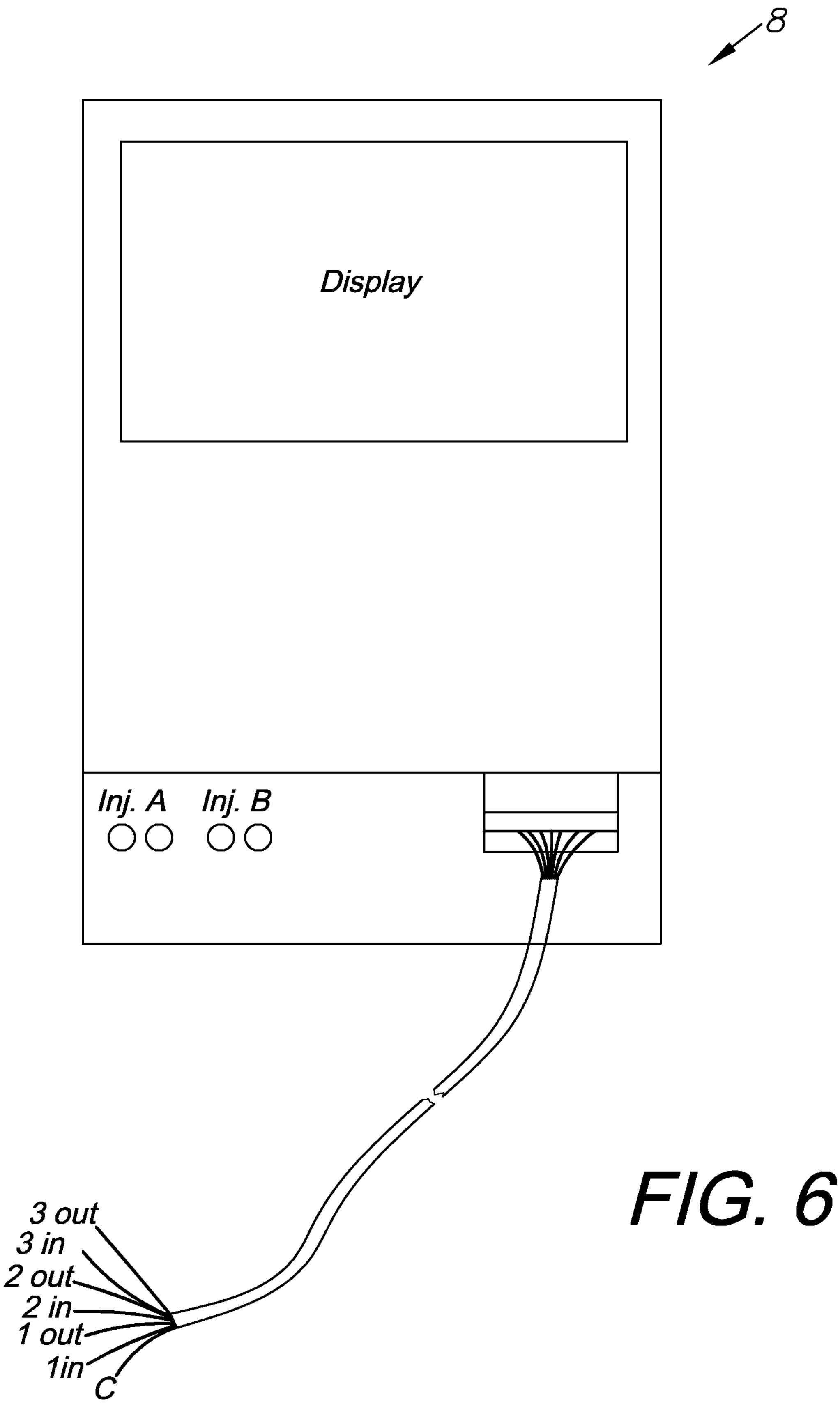
FIG. 6 is a drawing of a remote unit element thereof.

FIGS. 5 and 6 show example fertilizer controller units 6 and remote units 8, respectively. For the remote unit 6 shown in FIG. 6, 7 wires are used to control the various zones for controlling water and liquid additives. The two injectors shown only require two wires for powering due to the lack of polarity in the respective solenoids.

The original irrigation system includes the main controller (sprinkler timer) that controls a plurality of zones, and an additive injection controller. The controller unit senses which zone is activated by the sprinkler timer. The controller unit can inject one or a combination of more than one additive to that zone based on the user programmed rate for each additive injector. An example would be to inject turf liquid additive for turf zones and flower and shrub liquid additive for flower and shrub zones.

The control unit is mounted close to the sprinkler timer to sense zones activated by the sprinkler timer and the remote unit is located out by the plurality of zone valves that controls one or a combination of additive injectors per the signals from the main control unit that was user programmed for the additive injection rates for each additive injector.

As discussed above, all or some of the wires from the sprinkler timer that control the plurality of zone valves can be instead run to the control unit so the control unit still senses that the sprinkler timer is trying to turn on these specific zones. These wires that initially ran from the sprinkler timer to the plurality of zones can be repurposed. Instead, these wires can be run from the control unit to the remote unit. For instance, the controller unit can use one wire for power and two wires for communication between the control unit and the remote unit. The remote unit can use the power and output terminals to control the one or more injectors and one or more of the plurality of zones based on the output from the sprinkler timer that is connected to the main control unit. For example, the wires coming from the sprinkler timer that go to zones 1, 2 and 3 out in the valve box where the plurality of zones reside can be "re-purposed". The wires can be connected to the power, communication A and Communication B outputs on the main control unit. Jumper wires can then be connected from the sprinkler timer outputs for zones 1, 2, and 3 to the zone inputs 1, 2, and 3 on the main controller unit. At the valve box, the wires are still connected to the zone valves 1, 2, and 3. These can be disconnected from their respective zone valves and instead connected to the power, communication A and communication B inputs on the remote unit. Then wires can be run from the zone 1, 2, and 3 outputs on the remote unit to the zone valves 1, 2 and 3.

When the sprinkler timer turns on zone 1, for instance, the control unit will sense that zone 1 is turned on and send data from the control unit to the remote unit via the communication A and communication B wires that zone 1 is on. The remote unit will then activate the zone 1 output, thereby turning on zone 1. The data from the control unit will also tell the remote unit which additive injector(s) to fire and at what injection rate(s). The same would be the case for zone 2 and zone 3 in this case. Zone 4 in this case would be directly connected from the sprinkler timer but also jumpered to the main control unit so the main controller unit would only be sending the additive injector information. Of course, it would be possible to activate all of the sprinkler zones from the remote unit if desired in this manner. The benefit here is that typically the distance from the sprinkler timer to the plurality of zones can be great. It can be run through basement ceilings that are now finished or many other costly impediments to running additional wires. Controlling more than 3 zones via the communication from the liquid additive controller to the remote controller would free up existing wires. In other words, if 5 zones were controlled via the communication from the liquid additive controller 6 and the remote controller and since this communication only requires the repurposing of 3 wires, there would be 2 extra wires from the sprinkler timer/liquid additive controller to the zone valves and remote controller 8. These could be used to add additional zone valves to the system without the potentially expensive or difficult installation of additional zone wires. Often times zone wires can degrade over time and stop working (that is to say the wires no longer maintain the continuity from the sprinkler timer to the sprinkler valves). By freeing up additional wires per this example, the costly replacement of these broken wires could be eliminated.

Controlling more than 12 zones may necessitate a second control unit. This would need to be connected to the first control unit in a way that avoids crossover signals to the same zones.

III. Alternative Embodiment Liquid Additive Controller System 52

Figure 7:
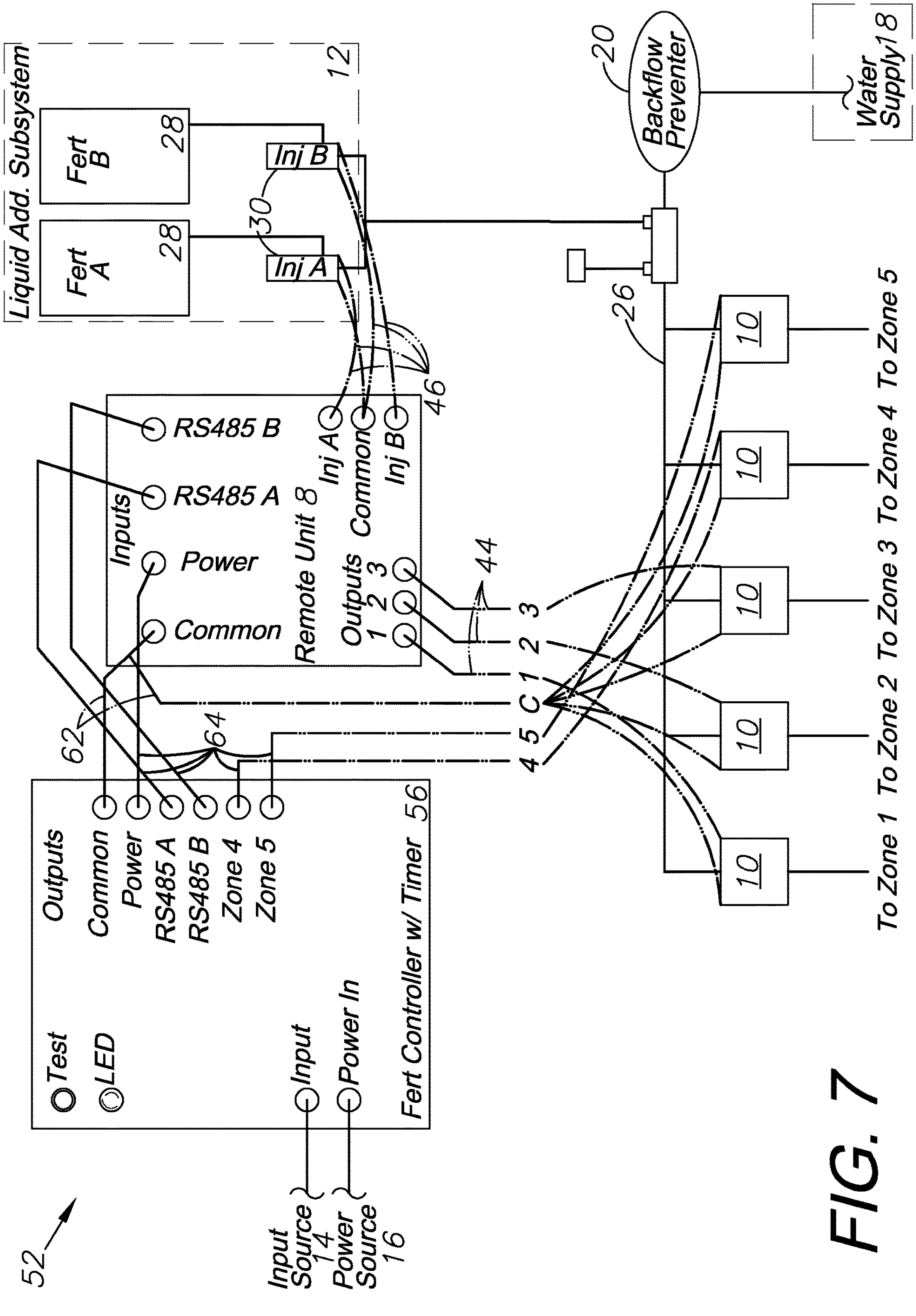
FIG. 7 is a diagrammatic representation of an alternative embodiment of the present invention wherein the sprinkler timer element and the fertilizer controller element are combined into a single element.

FIG. 7 shows an alternative embodiment liquid additive controller system 52 wherein the sprinkler timer 4 and the fertilizer controller 6 units of the previous embodiment are combined into a single controller unit 56. Combined common 62 and power 64 wires otherwise function similar to the previous embodiments.

IV. Alternative Embodiment Liquid Additive System 10

Figure 8:
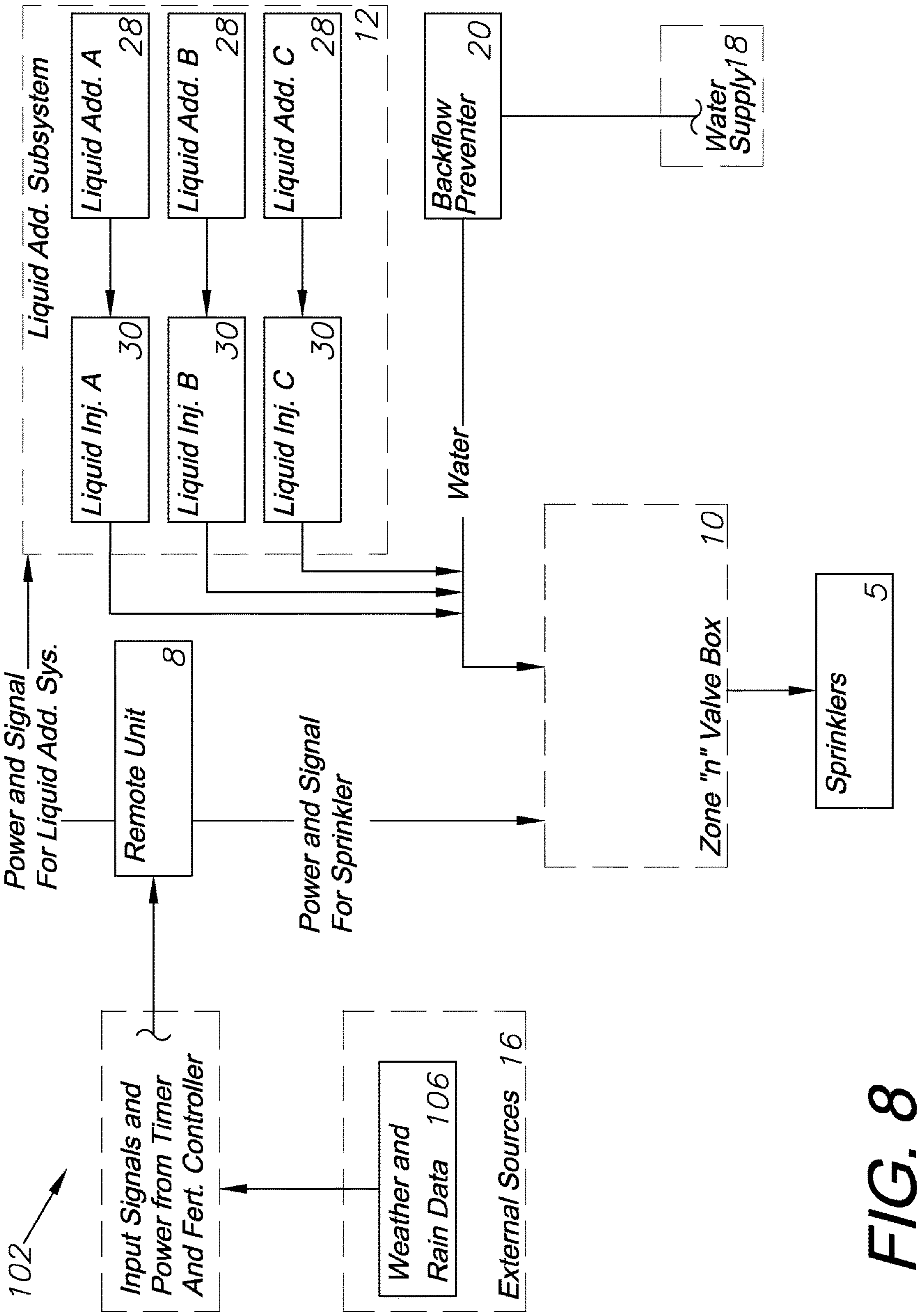
FIG. 8 is a block diagram of an alternative embodiment of the present invention wherein at least three liquid additives can be combined.

FIG. 8 shows an alternative embodiment liquid additive system 102 where three or more liquid additives 28 are injected into the water supply line 26 in varying amounts. Depending on the control signal sent, which may depend on the variety of plants in each respective zone, one or more of the liquid additives may be injected into the supply line 26 to each of the chosen zones. For example, one fertilizer storage tank 28 could include nitrogen, one could include phosphorus, and the third could include potassium. Depending on the prescribed fertilizer mixture desirable for plants in a specific zone, the system 102 could preselect and even premix the desired liquid additives to serve the plants in each respective zone.

Figure 9:
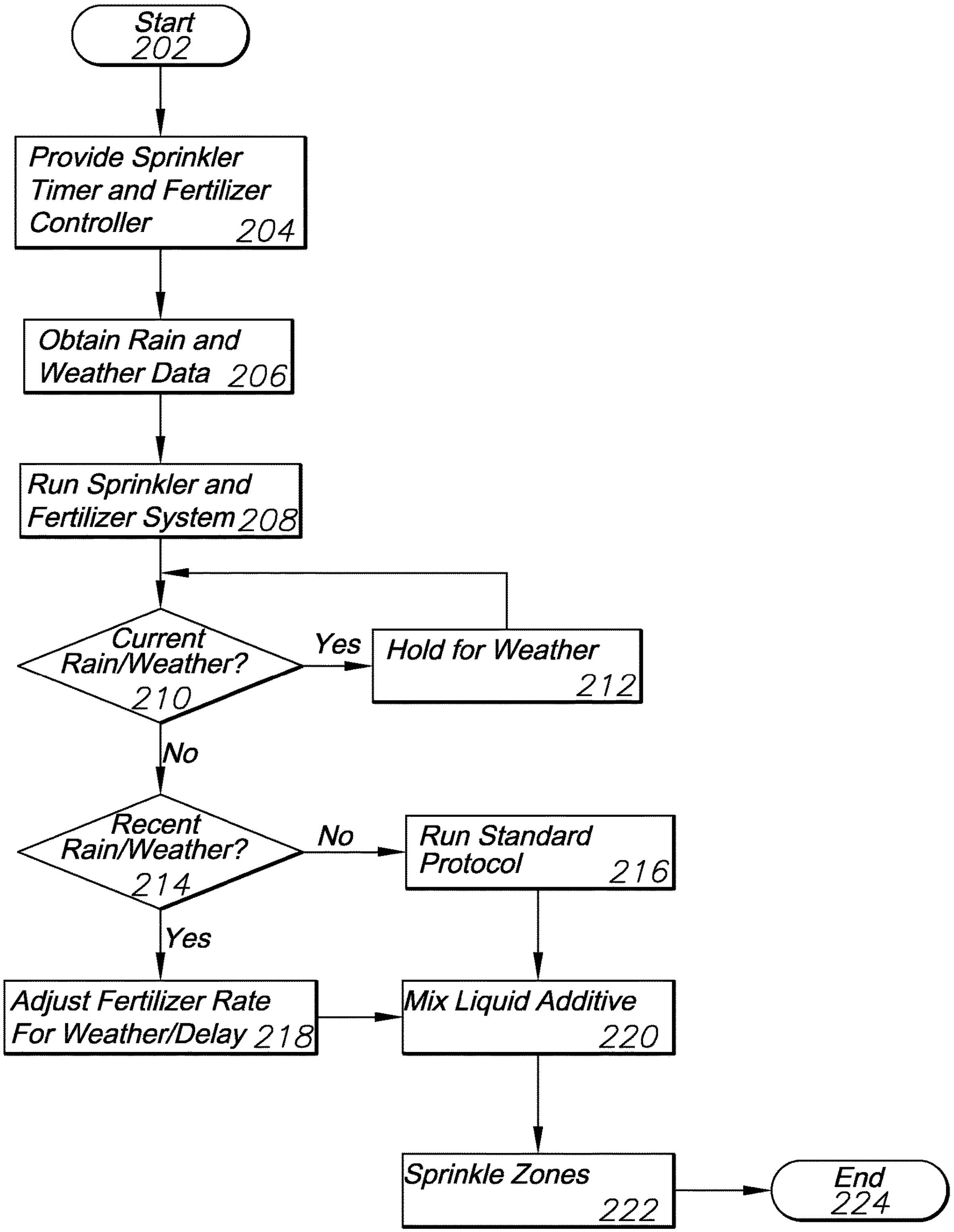
FIG. 9 is a flowchart diagramming the steps in practicing an embodiment of the present invention.

FIG. 9 shows a flowchart stepping through the steps taken to practice this embodiment of the present invention. The process starts at 202 and a sprinkler timer and fertilizer controller are provided at 204. Remote units may also be provided at this stage.

Rain and weather data is collected via third party sources at 206, and the sprinkler and fertilizer system is run at 208. If there is current weather or disruptive weather at 210, the system will hold off on sprinkling and adding fertilizer at 212 until the weather clears. Otherwise, the process continues to 214.

A check at 214 determines if recent rain and weather has held up the deployment of liquid additives. If there has been weather that has delayed the application of liquid additives, the system may increase the liquid additives to be applied at this step.

If no recent weather is determined, the system runs a standard protocol 216. Otherwise, the system runs an adjusted protocol at 218 to make up for missed fertilizer application. The liquid additive subsystem mixes the fertilizers and other additives at 220 depending on the protocol. The zones sprinkle, watering, fertilizing, and chemically treating the plants as prescribed at 222, and the process ends at 224.

The blend of liquid additives may change depending on season, weather, and plant time in each respective zone. The present invention optimizes liquid additive distribution to each zone of a sprinkler system using existing hardware or new hardware. The liquid additive could include mosquito repellent, animal repellent, bug killer, weed killer, or other liquid additives.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A liquid additive controller system for a horticultural watering system, the liquid additive controller system comprising:

a controller unit installed in proximity with a sprinkler timer, said sprinkler timer configured to control the horticultural watering system, wherein said controller unit is connected to said sprinkler timer and whereby said sprinkler timer provides zone output signals to said controller unit;

the horticultural watering system is divided into a plurality of zones, each of said plurality of zones comprising at least one sprinkler valve;

said controller unit controls at least two liquid additive containers connected to said horticultural watering system and controlled by said controller unit, whereby one or more of said at least two liquid additive containers can be directed to one or more injectors;

at least one remote unit installed remote from said controller unit in proximity with one said valve, said at least one remote unit in communication with said controller unit;

said at least one of said one or more injectors controlled via said remote unit;

wherein said plurality of zones comprises at least three zone valves; and wherein three of the wires that control the plurality of zones are repurposed to send power and communication signals to the remote unit to signal one or more of the liquid additive injectors to inject at a user programmed rate, as well as to control at least one of the three zone valves that were originally controlled using the wires that were repurposed for said power and communication, thereby freeing up extra wires for use on additional zones.

2. The liquid additive controller system of claim 1, wherein:

either of said controller unit or said remote unit are configured for programming via a communication means selected from the list comprising: Bluetooth; wifi, direct wiring, and other physical or wireless connection; and wherein said programming is provided via a software solution selected from the list comprising: a web-based app; iOS application; and Android application; using a computer.

3. The liquid additive controller system of claim 1, further comprising:

said controller communicatively connected to an external data source comprising external data; and optimizing with said controller the liquid additive based upon said external data.

4. The liquid additive controller system of claim 3, wherein said external data comprises weather data.

5. The liquid additive controller system of claim 1, further comprising:

said at least two liquid additives comprise a first liquid additive container containing a first liquid additive, a second liquid additive container containing a second liquid additive; and a third liquid additive container containing a third liquid additive;

said first liquid additive container associated with a first injector of said at least one injectors;

said second liquid additive container associated with a second injector of said at least one injectors;

said third liquid additive container associated with a third injector of said at least one injectors;

said controller configured to prescribe a mixture of one or more of said first liquid additive, said second liquid additive, and said third liquid additive;

injecting said mixture from said first liquid additive container, said second liquid additive container, and said third liquid additive container; and said mixture being mixed into water to be sprayed on one or more of said plurality of zones.

6. The liquid additive controller system of claim 5, wherein each of said first, second, and third liquid additives are selected from a list of liquid additives comprising: nitrogen; potassium; phosphorous; pest control; weed control; and fertilizers.

7. The liquid additive controller system of claim 1, further comprising integration with an existing sprinkler system, wherein said existing sprinkler system provides only irrigation functionality, and wherein said three of the wires that control the plurality of zones that are repurposed are wires belonging to said existing sprinkler system.

8. A liquid additive controller system for a horticultural watering system with an integrated sprinkler timer, the liquid additive controller system comprising;

a controller unit including the integrated sprinkler timer, said sprinkler timer configured to control the horticultural watering system, wherein said controller unit is connected to said sprinkler timer and whereby said sprinkler timer provides zone output signals to said controller unit;

said horticultural watering system is divided into a plurality of zones, each of said plurality of zones comprising at least one sprinkler valve;

said controller unit controls at least two liquid additive containers connected to said horticultural watering system and controlled by said controller unit, whereby one or more of said at least two liquid additive containers can be directed to one or more injectors;

wherein said plurality of zones comprises at least three zone valves; and wherein three of the wires that control the plurality of zones are repurposed to send power and communication signals to the remote unit to signal one or more of the liquid additive injectors to inject at a user programmed rate, as well as to control at least one of the three zone valves that were originally controlled using the wires that were repurposed for said power and communication, thereby freeing up extra wires for use on additional zones.

9. The liquid additive controller system of claim 8, wherein:

either of said controller unit or said remote unit are configured for programming via a communication means selected from the list comprising: Bluetooth; wifi, direct wiring, and other physical or wireless connection; and wherein said programming is provided via a software solution selected from the list comprising: a web-based app; iOS application; and Android application; using a computer.

10. The liquid additive controller system of claim 8, further comprising:

said sprinkler timer configured to sense the water flow rate via a flow meter installed in the main irrigation water line; and said liquid additive rate adjusted by said controller based upon said water flow rate.

11. The liquid additive controller system of claim 8, further comprising:
said controller communicatively connected to an external data source comprising external data; and
optimizing with said controller the liquid additive based upon said external data.

12. The liquid additive controller system of claim 11, wherein said external data comprises weather data.

13. The liquid additive controller system of claim 8, further comprising:
said at least two liquid additives comprise a first liquid additive container containing a first liquid additive, a second liquid additive container containing a second liquid additive; and a third liquid additive container containing a third liquid additive;
said first liquid additive container associated with a first injector of said at least one injectors;
said second liquid additive container associated with a second injector of said at least one injectors;
said third liquid additive container associated with a third injector of said at least one injectors;
said controller configured to prescribe, based upon said external data, a mixture of one or more of said first liquid additive, said second liquid additive, and said third liquid additive;
injecting said mixture from said first liquid additive container, said second liquid additive container, and said third liquid additive container; and
said mixture being mixed into water to be sprayed on one or more of said plurality of zones.

14. The liquid additive controller system of claim 13, wherein each of said first, second, and third liquid additives are selected from a list of liquid additives comprising: nitrogen; potassium; phosphorous; pest control; weed control; and fertilizers.

15. The liquid additive controller system of claim 8, further comprising:
said at least two liquid additives comprise a first liquid additive container containing a first liquid additive, a second liquid additive container containing a second liquid additive; and a third liquid additive container containing a third liquid additive;
said first liquid additive container associated with a first injector of said at least one injectors;
said second liquid additive container associated with a second injector of said at least one injectors;
said third liquid additive container associated with a third injector of said at least one injectors;
said controller configured to prescribe a mixture of one or more of said first liquid additive, said second liquid additive, and said third liquid additive;
injecting said mixture from said first liquid additive container, said second liquid additive container, and said third liquid additive container; and
said mixture being mixed into water to be sprayed on one or more of said plurality of zones.

16. The liquid additive controller system of claim 15, wherein each of said first, second, and third liquid additives are selected from a list of liquid additives comprising: nitrogen; potassium; phosphorous; pest control; weed control; and fertilizers.

17. The liquid additive controller system of claim 8, further comprising integration with an existing sprinkler system, wherein said existing sprinkler system provides only irrigation functionality, and wherein said three of the wires that control the plurality of zones that are repurposed are wires belonging to said existing sprinkler system.

* * * * *